W. SPARKS.
COMBINED SHEET METAL HUB AND PULLEY.
APPLICATION FILED JUNE 22, 1910.
985,711.
Patented Feb. 28, 1911.
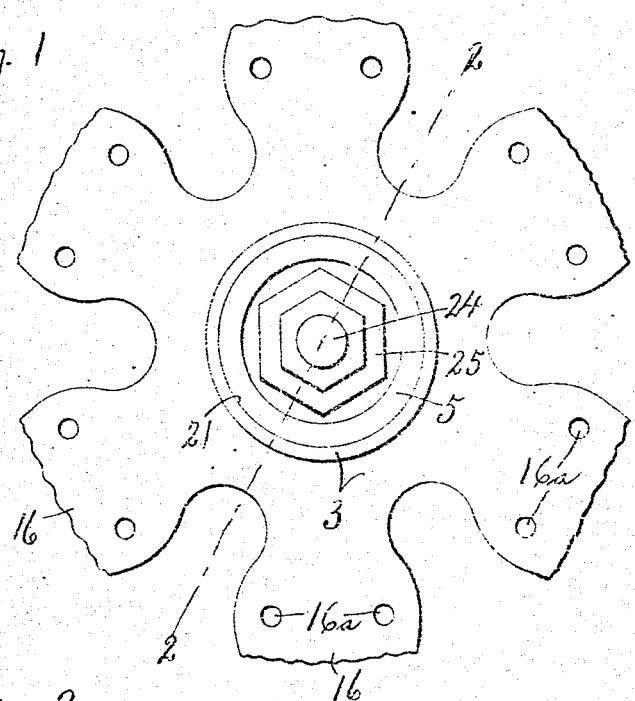
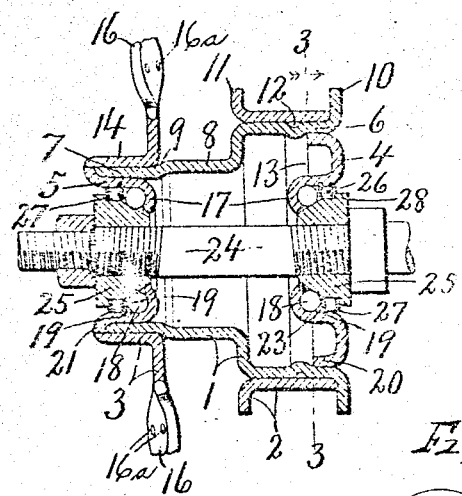
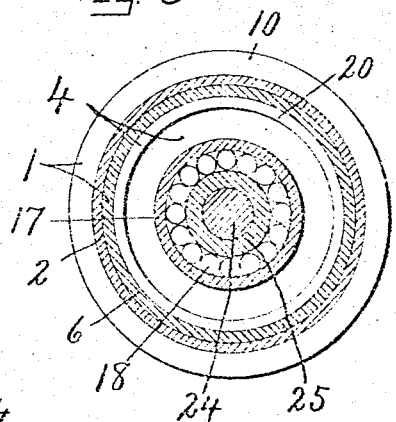
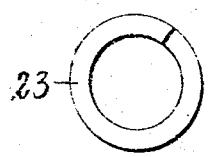
Witnesses
R. W. Bailey
H. E. Chase
Inventor
William Sparks
By Howard P. Denison
Attorney.

UNITED STATES PATENT OFFICE.

WILLIAM SPARKS, OF JACKSON, MICHIGAN, ASSIGNOR TO THE SPARKS-WITHINGTON COMPANY, LIMITED, OF JACKSON, MICHIGAN, A CORPORATION OF MICHIGAN.

COMBINED SHEET-METAL HUB AND PULLEY.

985,711.  Specification of Letters Patent.  Patented Feb. 28, 1911.

Application filed June 22, 1910. Serial No. 568,359.

*To all whom it may concern:*

Be it known that I, WILLIAM SPARKS, of Jackson, in the county of Jackson, in the State of Michigan, have invented new and useful Improvements in Combined Sheet-Metal Hubs and Pulleys, of which the following, taken in connection with the accompanying drawings, is a full, clear, and exact description.

This invention relates to a combined sheet metal hub and pulley for supporting and driving rotary fans and similar elements.

The object is to produce a combined hub, pulley and blade support as a unitary structure made up compactly of comparatively thin sheet metal tubular elements and assembled in such manner as to be at once light, strong, durable and capable of being manufactured at a low cost ready for use in connection with any of the well known forms of fan blades.

Other objects and uses relating to specific parts of the device will be brought out in the following description.

In the drawings: Figure 1 is an end elevation of the combined hub and pulley showing the main portion of the winged element for receiving the fan blades, not shown. Fig. 2 is a sectional view taken on line 2—2, Fig. 1. Fig. 3 is a transverse sectional view taken on line 2—3, Fig. 2, except that it shows the full circular form of the elements intersected by said line. Fig. 4 is a detail illustrating a ball retaining member.

This device comprises a main hub section —1—, a pulley section —2—, a winged section —3— for receiving and supporting fan blades, not shown, and opposite end bearing sections —4— and —5— all of which parts are made of sheet metal permanently nested together in a manner hereinafter described. The opposite ends, as —6— and —7—, and intermediate portion, as —8—, of the main hub section —1— are cylindrical and of unequal diameters, the end —6— being largest while the end —7— is considerably smaller than either the large end —6— or intermediate portion —8— and forms at its junction with the intermediate portion an annular shoulder —9—, as best seen in Fig. 2. The outer end of the larger portion —6— terminates in an outturned flange —10— which serves not only as a guide flange for one side of the belt which travels around the periphery of the pulley section —2—, but also reinforces or stiffens the hub at this point and affords an abutment against which the pulley section —2— is forced. This pulley section —2— is fitted tightly upon the periphery of and is substantially the same length as the cylindrical portion —6— of the main hub section with its outer edge abutting against the flange —10— and its inner edge formed with an outturned annular flange —11— which forms a guide for the opposite side of the belt. This belt section —2— constitutes the gripping surface for such belt. The central portion of the largest end —6— of the main hub section —1— is depressed inwardly forming an annular groove —12— and an inwardly projecting annular rib —13—, the latter serving as an abutment for limiting the inward movement of the adjacent bearing section —4—. In some instances the pulley section —2— may be omitted and the groove —12— utilized for receiving and guiding a round belt which may be employed to transmit rotary motion to the hub.

The winged section —3— is provided with an axially extending annular flange —14— of slightly greater length than that of the smallest cylindrical end —7— upon which it is tightly fitted and abuts against the shoulder —9—, the latter forming a limiting stop to prevent excessive inward movement of the winged section upon the cylindrical portion —7—. This winged section is also provided with a series of radially projecting arms or wings —16— spaced a uniform distance apart, each wing being formed with one or more apertures 16ª for receiving rivets, not shown, by which any suitable fan blades may be secured to the arm —16—.

The bearing sections —4— and —5—, as best seen in Fig. 2, preferably consist of sheet metal rings of special structure having their inner edges deflected toward each other some distance inwardly from the opposite ends of the hub and in substantially the same plane and formed with return bends constituting annular grooves or raceways —17— for receiving ball bearings —18—. The outer marginal edge of the bearing section —4— is also deflected inwardly forming an annular flange —20— which is fitted tightly within the larger end —6— of the hub section —1— and against the rib —13—. The main body of the bearing section —4— between the ball race —17— and flange —20— extends outwardly some distance beyond said ball race and is disposed in substantially the same transverse plane as the flange —10— thereby affording a neat and smooth end surface for the entire device. In like manner the bearing section —5— extends outwardly some distance beyond its race way —17— and terminates in an outturned flange —21— which abuts against the adjacent end face of the reduced portion —7— of the hub section, said bearing section —5— being tightly fitted within the reduced portion —7— to rotate therewith. The flange —14— is of sufficient length to cover the joint between the outer end of the bearing section —5— and adjacent end face of the hub portion —7— and terminates coincident with the end face of said bearing section to afford a smooth end surface.

The object in extending the bearing sections —4— and —5— outwardly and axially some distance beyond their respective ball races is to provide for the retention and reception of suitable ball retaining members —23— which preferably consist of thin split rings of spring metal which when placed in position for use are spring pressed into annular grooves —19— in said bearing sections just at the outer sides of the ball bearings —18—.

It is apparent from the foregoing description that the combined hub and pulley including the winged element —3—, ball bearings —18— and retainers —23— may be made up as a unitary article of manufacture adapted to be used in connection with any suitable shaft or axle —24— as shown in Fig. 2, said axle being provided with cone bearings —25—, one at least of which is adjustable to take up wear and under such conditions I provide suitable dust-proof packings —26— which are held in place against the outer faces of the retainers —23— by additional rings —27—, the latter being retained in position by shoulders —28— on the adjacent cones —25—.

The sheet metal sections 1, 2, 3, 4 and 5 constituting the main elements of the combined hub and pulley are permanently and tightly nested together under pressure or with a driving fit, so as to rotate together as a unit, the balls and ball retainers being also inserted in position to complete the device as an article of manufacture.

What I claim is:

A combined sheet metal hub and pulley comprising a tubular hub section having one end of larger diameter than the other, an intermediate portion of larger diameter than the smaller end and of smaller diameter than the larger end, and an annular flange carried by the larger end, a pulley section mounted on the larger end, said end having an annular depression, bearing sections mounted on the axle adjacent the ends of the hub, the bearing section adjacent the smaller end of the hub provided with an extension snugly fitting the periphery of the smaller end of the hub and terminating in arms adapted to receive fan blades.

In witness whereof I have hereunto set my hand on this 18th day of May 1910.

WILLIAM SPARKS.

Witnesses:
 JOHN A. CLARK,
 JAS. P. DOLAN.